United States Patent

Benjamin et al.

(10) Patent No.: US 8,108,284 B2
(45) Date of Patent: Jan. 31, 2012

(54) METHOD AND SYSTEM FOR IMPLEMENTING AN OFFER/COUNTEROFFER NEGOTIATION

(75) Inventors: Kareem Benjamin, San Francisco, CA (US); Manish Srivastava, San Carlos, CA (US); Kim Powell, Niwot, CO (US); Parisa Hudson, San Francisco, CA (US); Erich Stiegler, San Jose, CA (US); Yu Lung Ng, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1450 days.

(21) Appl. No.: 10/185,121

(22) Filed: Jun. 27, 2002

(65) Prior Publication Data

US 2009/0043685 A1    Feb. 12, 2009

(51) Int. Cl.
*G06Q 40/00*    (2006.01)
(52) U.S. Cl. ............................................. 705/37
(58) Field of Classification Search .............. 705/26, 705/37, 80, 1
See application file for complete search history.

(56) References Cited

U.S. PATENT DOCUMENTS

| | | | |
|---|---|---|---|
| 5,890,138 A * | 3/1999 | Godin et al. | 705/26 |
| 6,157,934 A | 12/2000 | Khan et al. | |
| 6,704,716 B1 * | 3/2004 | Force | 705/80 |
| 7,200,570 B1 * | 4/2007 | Wu | 705/37 |
| 2001/0032165 A1 * | 10/2001 | Friend et al. | 705/37 |
| 2002/0083016 A1 * | 6/2002 | Dittrich et al. | 705/80 |
| 2002/0120552 A1 * | 8/2002 | Grey et al. | 705/37 |
| 2002/0178127 A1 * | 11/2002 | Byde et al. | 705/80 |
| 2003/0028469 A1 | 2/2003 | Bergman et al. | |
| 2009/0089216 A1 | 4/2009 | Srivastava et al. | |

FOREIGN PATENT DOCUMENTS

WO    WO 01/27840 A1    4/2001

* cited by examiner

*Primary Examiner* — Lindsay M. Maguire
(74) *Attorney, Agent, or Firm* — Kilpatrick Townsend & Stockton LLP

(57) ABSTRACT

A method for implementing an offer/counteroffer negotiation. Characteristics of an offer for an item are received, wherein the characteristics comprise at least one term defining the offer. The offer is published to a plurality of bidders. Among the potential responses to the offer, at least one counteroffer is received from a bidder. The counteroffer comprises at least one alternative term. Provided the counteroffer is acceptable, the counteroffer is accepted. Provided the counteroffer is not acceptable, a second counteroffer is transmitted to the bidder, wherein the second counteroffer comprising at least one alternative term with respect to the counteroffer. The present invention allows a negotiator to negotiate terms with one or more bidders individually, outside the constraints of a traditional auction.

13 Claims, 7 Drawing Sheets

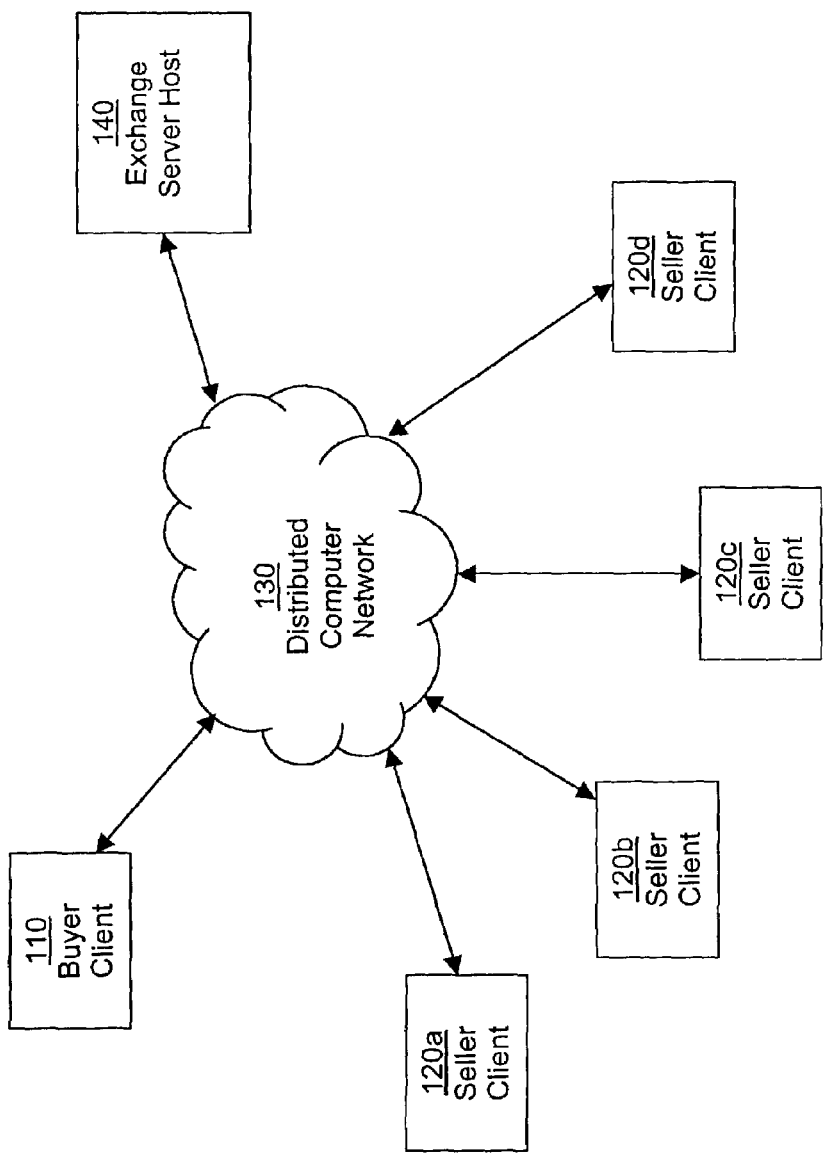

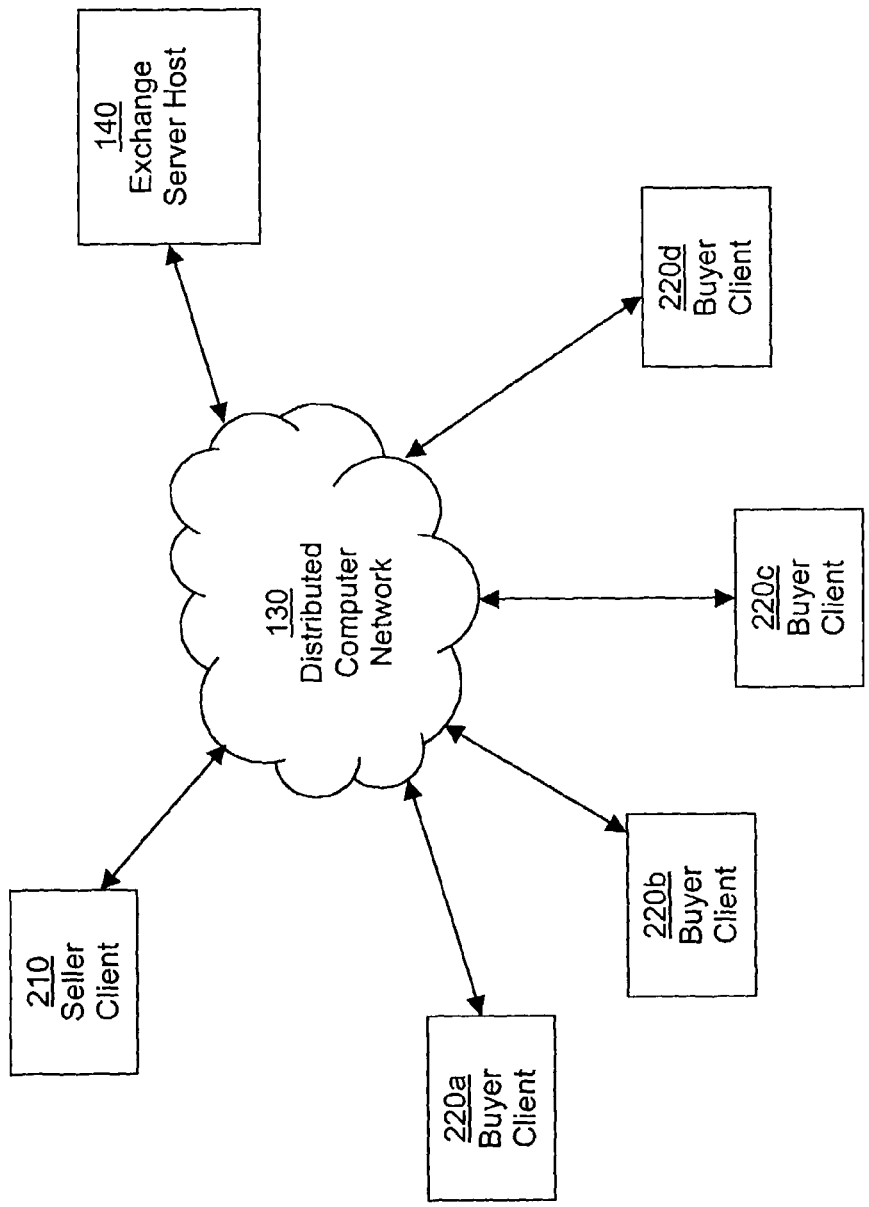

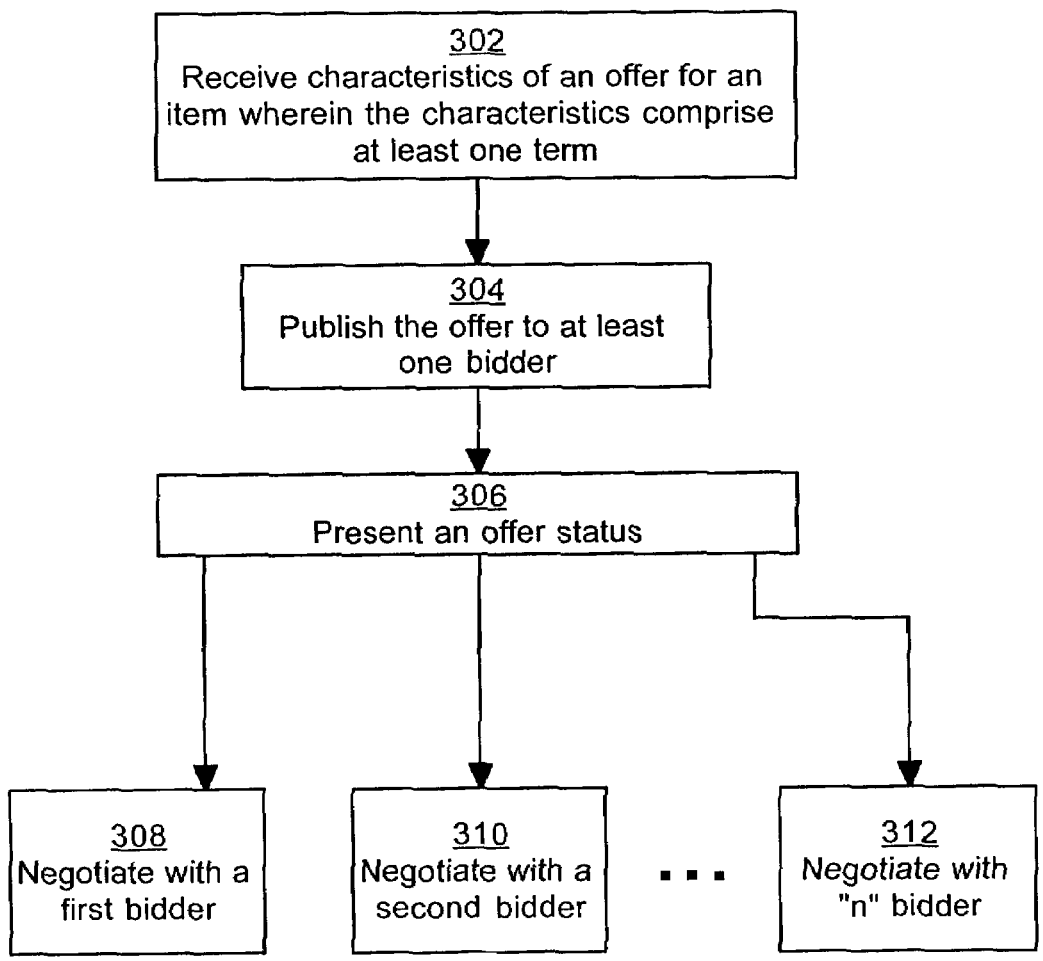

| | |
|---|---|
| Item: | Yellow XXL Widget |
| Requested Price: | $50/widget |
| Requested Delivery Date: | March 1, 2002 |
| Quantity Requested: | 500 |
| Offer Start Time: | 12:00 PM, February 1, 2002 |
| Offer End Time: | 2:00 PM, February 1, 2002 |
| Quantity Remaining: | 200 |

METHOD AND SYSTEM FOR IMPLEMENTING AN OFFER/COUNTEROFFER NEGOTIATION

FIELD OF INVENTION

Embodiments of the present invention pertain to the field of electronic commerce. More particularly, the present invention relates to a method and system for implementing an offer/counteroffer negotiation in electronic commerce buying and selling operations.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. Traditional buying and selling mediums, such as auctions, catalog based purchasing, and selling, and the like, do not always facilitate the most efficient matching of requirements. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). To take advantage of advances in network technology, a variety of electronic commerce facilitating schemes have been developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges has proliferated, the implementation of electronic commerce auctions has become increasingly common. Auctions are different from traditional catalog based commerce schemes. Auctions generally aggregate buyers or sellers to purchase or sell items/services through the respective submission of competitive bids. Generally, the most competitive bid is designated the winner of the auction. For example, in an auction amongst multiple competing buyers, the most competitive bid is usually the bid offering the most money for the specified item or service. In an auction amongst multiple competing sellers, the most competitive bid is usually the bid offering the specified item or service for the lowest price.

Thus, buyers and sellers participating in an auction compete with one another on the basis of the terms of their bids. Auctioneers have an interest in making the bidding process as competitive as possible to effect the most efficient matching of requirements between sellers and buyers (e.g., getting the best deal). Large numbers of buyers or sellers competitively trying to outbid one another usually leads to the most favorable terms.

However, auctions are usually rigid with respect to certain terms. For example, in a procurement auction with multiple sellers, a buyer will establish certain terms such as a required delivery date, a required quantity, or other terms describing the item (e.g., color, size or condition). If a seller can meet the terms, they may bid on the item. However, if the seller cannot meet all of the required terms, they cannot bid on the item. Because auctions are rigid, it is not possible for a potential bidder to deviate from the structure of the auction, often to the detriment of the organizer of the auction as well as the bidder.

Consider the following example. In an auction amongst multiple competing suppliers (e.g., sellers), the buyer establishes a required delivery date. If a potential supplier cannot meet that delivery date, they can not enter the auction. However, it is possible that the potential seller would make the lowest bid in price, but would miss the delivery date by a short time period. Furthermore, it is possible that the buyer would want to accept the bid of the potential supplier because it is so low and because the delivery date is only missed by a few days. It is possible that it is of more value to the buyer to get the lower priced item at a later date.

Furthermore, current auction formats do not allow an auction organizer to change the terms of the auction with respect to individual bidders. On the contrary, the auction organizer can only change the terms with respect to all auction participants. Unfortunately, current auction formats do not permit deviation from the required criterion as detailed by the auction organizer. As such, current auction formats are not flexible enough to account for the true value of the item to the auction organizer, but rather only account for rigid predefined terms.

SUMMARY OF THE INVENTION

Accordingly, a need exists for a method for implementing a negotiation format that is less rigid than current auction methods. A need also exists for a method that satisfies the above need, and allows for the negotiation organizer to change the terms of the negotiation with respect to individual bidders. A need also exists for a method that satisfies the above needs, and allows for the negotiation organizer to negotiate terms with individual bidders.

A method for implementing an offer/counteroffer negotiation is presented. Characteristics of an offer for an item are received, wherein the characteristics comprise at least one term defining the offer. In one embodiment, the price of the item is a term. In another embodiment, the required delivery date is a term. In another embodiment, the quantity required is a term. The offer is published to a plurality of bidders.

The potential responses to the offer can be a counteroffer or an acceptance from the bidder. The counteroffer comprises at least one alternative term. Provided the counteroffer is acceptable, the counteroffer is accepted. Provided the counteroffer is not acceptable, a second counteroffer is transmitted to the bidder, wherein the second counteroffer comprising at least one alternative term with respect to the counteroffer. The present invention allows a buyer or seller to negotiate terms with one or more bidders individually, outside the constraints of a traditional auction. Alternatively, a potential response to the offer is an acceptance of the offer from a bidder. This signifies that the bidder accepts the terms as set forth in the offer and there is no need to further negotiate the terms.

In one embodiment, a third counteroffer is received from a second bidder, wherein the third counteroffer comprises at least one third alternative term. Provided the third counteroffer is acceptable, the third counteroffer is accepted. Alternatively, provided the third counteroffer is not acceptable, a fourth counteroffer is transmitted to the second bidder, wherein the fourth counteroffer comprises at least one fourth alternative term.

In one embodiment, the offer status is presented. In one embodiment, the offer status is presented to the plurality of bidders over a computer network. In one embodiment, the offer status comprises a remaining quantity of the item. In one embodiment, provided the counteroffer is accepted, the remaining quantity is updated.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 illustrates a block diagram of an electronic commerce offer/counteroffer negotiation operation in accordance with one embodiment of the present invention.

FIG. 2 illustrates a block diagram of an electronic commerce offer/counteroffer negotiation operation in accordance with an alternative embodiment of the present invention.

FIG. 3 illustrates a flowchart showing steps in a process for implementing an offer/counteroffer negotiation in accordance with one embodiment of the present invention.

FIG. 5 illustrates an exemplary screen shot of the offer status in accordance with one embodiment of the present invention.

DETAILED DESCRIPTION

Figure 4A:
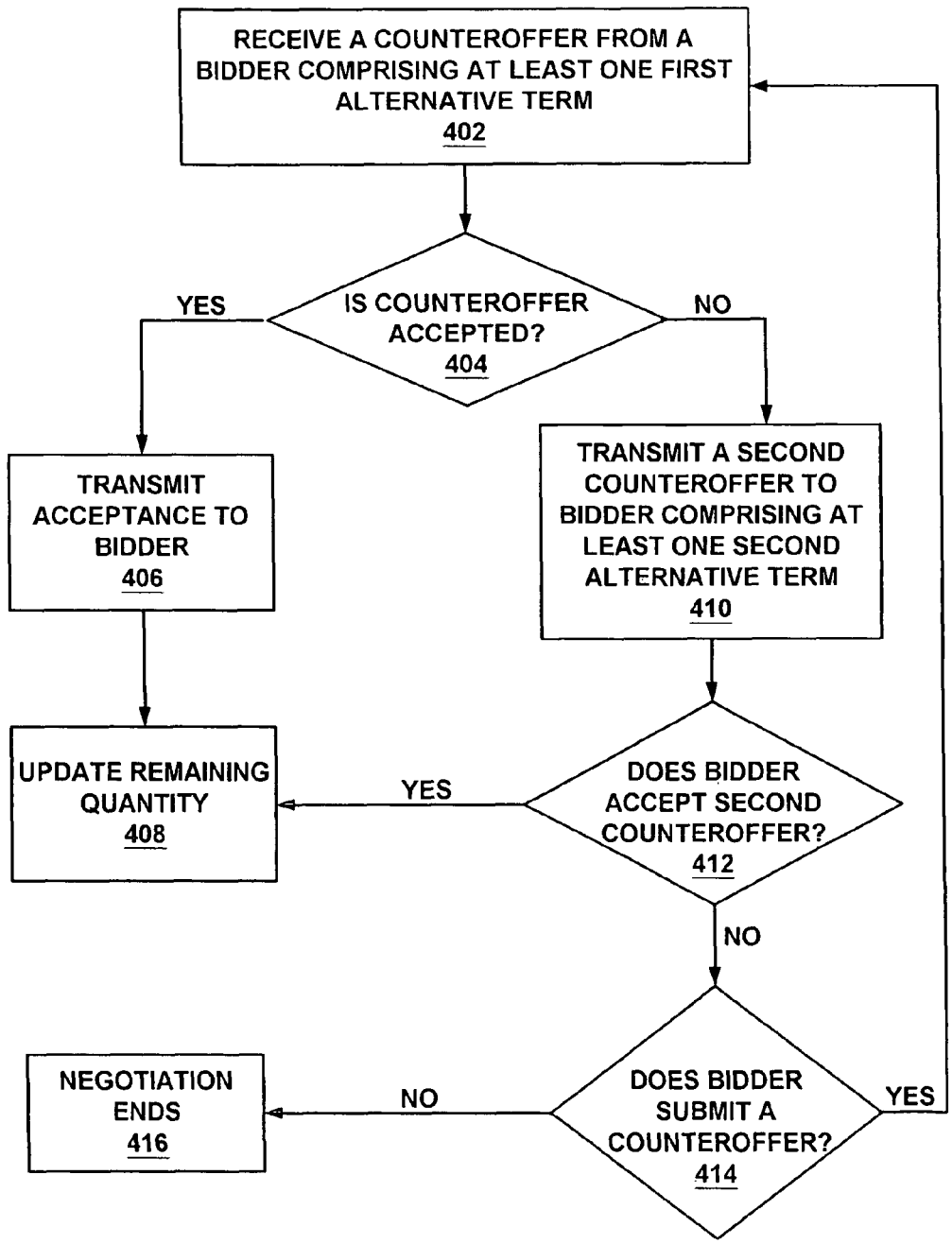
FIGS. 4A and 4B illustrate flowcharts showing steps in a process for conducting an offer/counteroffer negotiation in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

The present invention provides a method and system for implementing an offer/counteroffer negotiation. Embodiments of the present invention allow for the organizer of the negotiation to define an offer by determining initial terms. Additionally, embodiments of the present invention allow for the organizer of the negotiation to receive counteroffers from bidders, and to negotiate with each bidder independently regarding the terms of the bids. Additionally, embodiments of the present invention provide the negotiation participants with a negotiation status display.

It should be appreciated that embodiments of the present invention may implement an offer/counteroffer negotiation. For purposes of the present application, the term "item" is understood to refer to both items and/or services.

Embodiments of the present invention may be directed towards private and public exchanges, wherein private exchanges are scenarios having one negotiation organizer and many bidders, and wherein public exchanges have many organizers and many bidders. For purposes of simplicity, the present application refers to private exchanges.

Notation and Nomenclature

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "publishing" or "accepting" or "transmitting" or "presenting" or "updating" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Method and System for Implementing an Offer/Counteroffer Negotiation

Referring now to FIG. 1, a diagram of an electronic exchange offer/counteroffer negotiation system 100 in accordance with one embodiment of the present invention is shown. As depicted in FIG. 1, system 100 includes an exchange server host 140 communicatively coupled to a buyer client 110 and a plurality of seller clients 120*a-d* via a distributed computer network 130. Offer operations in accordance with system 100 are at times referred to as "offer to buy" where sellers submit competing counteroffers to sell specified products and/or services to a buyer.

The exchange server host 140 functions as the central communications point for the negotiation operations, by conducting data collection and management of item information (e.g., items, services, or the like) and the offer characteristics and terms provided by buyer clients, such as buyer client 110, and counteroffer information provided by the seller clients 120a-d. In one embodiment, exchange server host 140 performs a method for implementing an offer/counteroffer negotiation (e.g., process 300 of FIG. 3). Buyer client 110 and seller clients 120a-d communicate with exchange server host 140 via the communications protocols of distributed computer network 130, hereafter simply network 130. Exchange server host 140 conducts the negotiation operations on the basis of the competing counteroffer information from seller clients 120a-d.

A typical offer/counteroffer negotiation operation comprises seller clients 120a-d accessing characteristics defining an offer for an item stored on exchange server host 140 by buyer client 110 and submitting competing counteroffers to exchange server host 140 for the item. In one embodiment, the characteristics comprise at least one term. The counteroffers are transmitted from seller clients 120a-d to exchange server host 140 via network 130. Similarly, the characteristics are provided to exchange server host 140 by buyer client 110 via network 130.

It should be noted that the embodiment of the present invention depicted in FIG. 1 (e.g., system 100) is implemented as a software based process cooperatively executing on the respective computer system platforms of both exchange server host 140 and seller clients 120a-d. The basic components of the computer system platforms are shown in the example computer system 600 of FIG. 6 below.

Referring still to FIG. 1, network 130 includes well know network technologies. For example, network 130 can be implemented using LAN technologies (e.g., Ethernet, Token-ring, etc.), the Internet, or other wired or wireless network technologies. The communications links between exchange server host 140, buyer client 110, seller clients 120a-d and network 130 can be implemented using, for example, a telephone circuit, communications cable, optical cable, wireless link, or the like.

FIG. 2 shows a system 200 in accordance with an alternative embodiment of the present invention. System 200 is substantially similar to system 100 of FIG. 1, however, system 200 depicts an offer/counteroffer negotiation operation wherein buyer clients 220a-d compete to buy products or services from a seller client 210. Offer operations in accordance with system 200 are at times referred to as "offer to sell" or where buyers submit competing counteroffers to purchase specified items and/or services from a seller.

The offer/counteroffer operation depicted in FIG. 2 comprises buyer clients 220a-d accessing characteristics defining an offer of an item stored on exchange server host 140 by seller client 210 and submitting competing counteroffers to exchange server host 140 in order to buy the specified product or service from seller client 210. In one embodiment, the characteristics comprise at least one term. In a manner similar to system 100 of FIG. 1, the counteroffers are transmitted from buyer clients 220a-d to exchange server host 140 via network 130, and the characteristics are provided to exchange server host 140 by seller client 210 via network 130.

FIG. 3 illustrates a flowchart showing steps in a process 300 for implementing an offer/counteroffer negotiation in accordance with one embodiment of the present invention. In one embodiment, process 300 is carried out by processors and electrical components under the control of computer readable and computer executable instructions. Although specific steps are disclosed in process 300, such steps are exemplary. That is, the embodiments of the present invention are well suited to performing various other steps or variations of the steps recited in FIG. 3. As depicted in FIG. 3, process 300 diagrams the operating process of implementing an offer/counteroffer negotiation as performed by, for example, system 100 of FIG. 1, as a buyer performs an offer to buy an item from multiple competing sellers.

At step 302 of process 300, characteristics of an offer of or for an item are received. In one embodiment, the characteristics comprise at least one term, wherein a term defines a particular aspect of the item. In one embodiment, the price of the item is a term. In another embodiment, the required delivery date is a term. In another embodiment, the quantity required is a term. It should be appreciated that a term can be any aspect of the item or offer as defined by the negotiation organizer.

At step 304, the offer is published to at least one bidder. In one embodiment, the offer is published over a distributed computer network (e.g., distributed computer network 130 of FIGS. 1 and 2). In one embodiment, the offer is published by transmitting an electronic message to potential participants. It should be appreciated that the offer can be published in any way intended to apprise potential participants of the existence of the offer.

At step 306, an offer status is presented. In one embodiment, the offer status is presented to the participants over a computer network (e.g., computer network 130 of FIG. 1) and displayed on a client device (e.g., seller client 120a of FIG. 1). FIG. 5 illustrates an exemplary screen shot 500 of an offer status in accordance with one embodiment of the present invention.

The offer status illustrated at screen shot 500 of FIG. 5 comprises information pertaining to the offer and the item. In one embodiment, the offer status comprises a brief description of the item, and various terms of the offer (e.g., requested price, requested delivery date, and quantity requested). In one embodiment, the offer status comprises offer timing information (e.g., offer start time, offer end time, time remaining, and time elapsed). In one embodiment, the offer status comprises a remaining quantity of the item. It should be appreciated that the offer status can be configured to display any information desired by the negotiation organizer, and is not intended to be limited by the present embodiment of screen shot 500.

Figure 4B:
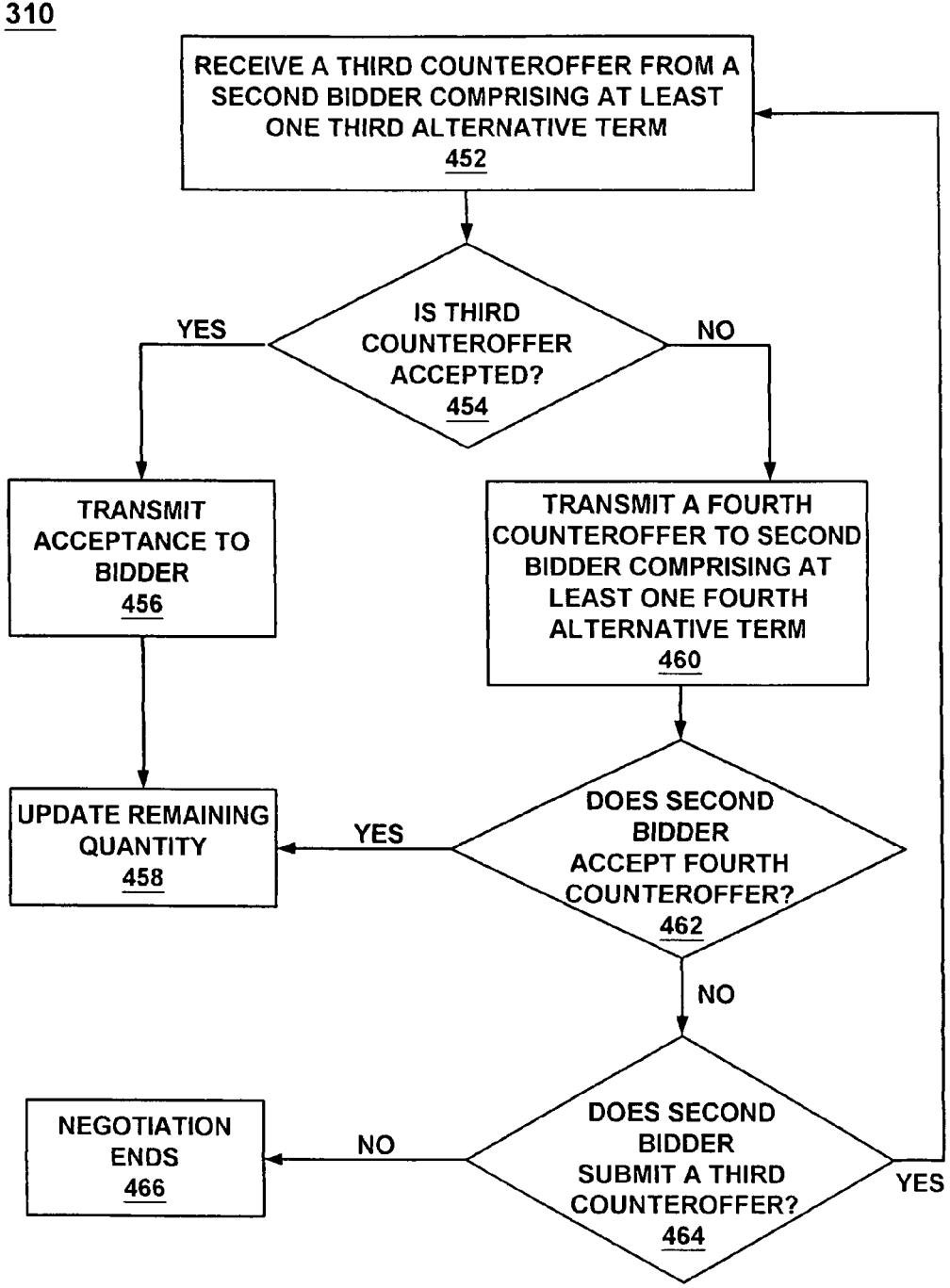

With reference to FIG. 3, process 300 provides for allowing a negotiation organizer to negotiate individually with at least one bidder. As shown in FIG. 3 at steps 308 and 310, process 300 provides for negotiations with a first bidder and a second bidder independently and in parallel. In one embodiment, as shown at step 312, process 300 provides an offer/counteroffer negotiation with "n" bidders, where n is any whole number. FIGS. 4A and 4B illustrate flowcharts showing steps in a process for conducting an offer/counteroffer negotiation in accordance with one embodiment of the present invention.

FIG. 4A illustrates a flowchart 308 showing steps in a process for conducting an offer/counteroffer negotiation with a bidder in accordance with one embodiment of the present invention. At step 402, a counteroffer is received from the bidder, wherein the counteroffer comprises at least one first alternative term. It should be appreciated that the first alternative term may be with regard to any term defined in the offer characteristics. For example, the bidder may not agree with the price term as indicated by the negotiation organizer, and include an alternative price term in the counteroffer. It should be further appreciated that any number of alternative terms may be included in the counteroffer (e.g., a different price, a different delivery date, and a different quantity). Alternatively, it should be appreciated that a potential response to the offer is an acceptance of the offer from a bidder. This signifies that the bidder accepts the terms as set forth in the offer and there is no need to further negotiate the terms.

At step 404, it is determined whether the counteroffer is accepted. It should be appreciated that the counteroffer is presented to the negotiation organizer. In one embodiment, the counteroffer is presented to the negotiation organizer over a computer network (e.g., computer network 130 of FIG. 1) and displayed on a client device (e.g., buyer client 110 of FIG. 1). The negotiation organizer indicates whether the counteroffer is acceptable by notifying a central communications point (e.g., exchange server host 140 of FIG. 1) over the network.

In one embodiment, provided the counteroffer is accepted, as shown at step 406, an acceptance is transmitted to the bidder. This signifies that the bidder accepts the terms as set forth in the offer and there is no need to further negotiate the terms. At step 408, the remaining quantity of the offer status (e.g., FIG. 5) is updated to account for the accepted counteroffer.

In one embodiment, provided the counteroffer is not accepted, as shown at step 410, a second counteroffer is transmitted to the bidder, wherein the second counteroffer comprises at least one second alternative term. It should be appreciated that the second alternative term may be with regard to any first alternative term received in the counteroffer.

At step 412, it is determined whether the bidder accepts the second counteroffer. It should be appreciated that the second counteroffer is presented to the bidder. In one embodiment, the second counteroffer is presented to the bidder over a computer network (e.g., computer network 130 of FIG. 1) and displayed on a client device (e.g., seller client 120a of FIG. 1). The bidder indicates whether the second counteroffer is acceptable by notifying a central communications point (e.g., exchange server host 140 of FIG. 1) over the network.

Provided the second counteroffer is accepted by the bidder, the remaining quantity of the offer status (e.g., FIG. 5) is updated to account for the accepted counteroffer, as shown at step 408. Alternatively, provided the second counteroffer is not accepted by the bidder, as shown at step 414, it is determined whether the bidder submitted a counteroffer. Provided the bidder submits a counteroffer in response to the second counteroffer, process 308 returns to step 402. Alternatively, provided the bidder does not submit a counteroffer, as shown at step 416, process 308 ends.

It should be appreciated that process 308 may be repeated any number of times, allowing the negotiation organizer and the bidder to effectively negotiate the terms of the offer. Furthermore, process 308 may be performed for any number of bidders, wherein each occurrence of process 308 is performed independently.

FIG. 4B illustrates a flowchart showing steps in a process 310 for conducting an offer/counteroffer negotiation with a second bidder in accordance with one embodiment of the present invention. It should be appreciated that process 310 operates in substantially the same manner as process 308 of FIG. 4A. At step 452, a third counteroffer is received from the second bidder, wherein the third counteroffer comprises at least one third alternative term. It should be appreciated that the third alternative term may be with regard to any term defined in the offer characteristics. It should be further appreciated that any number of third alternative terms may be included in the third counteroffer (e.g., a different price, a different delivery date, and a different quantity).

At step 454, it is determined whether the third counteroffer is accepted. It should be appreciated that the third counteroffer is presented to the negotiation organizer. In one embodiment, provided the third counteroffer is accepted, as shown at step 456, an acceptance is transmitted to the second bidder. At step 458, the remaining quantity of the offer status (e.g., FIG. 5) is updated to account for the accepted third counteroffer.

In one embodiment, provided the third counteroffer is not accepted, as shown at step 460, a fourth counteroffer is transmitted to the second bidder, wherein the fourth counteroffer comprises at least one fourth alternative term. It should be appreciated that the fourth alternative term may be with regard to any third alternative term received in the third counteroffer.

At step 462, it is determined whether the second bidder accepts the fourth counteroffer. Provided the fourth counteroffer is accepted by the second bidder, the remaining quantity of the offer status (e.g., FIG. 5) is updated to account for the accepted fourth counteroffer, as shown at step 458. Alternatively, provided the fourth counteroffer is not accepted by the second bidder, as shown at step 464, it is determined whether the second bidder submitted a third counteroffer in response to the fourth counteroffer. Provided the second bidder submits a third counteroffer, process 310 returns to step 452. Alternatively, provided the second bidder does not submit a third counteroffer, process 310 ends.

Embodiments of the present invention provide a method for 10, implementing a negotiation format that is less rigid than typical auction methods. Embodiments of the present invention also provide a method that allows for the negotiation organizer to change the terms of the offer with respect to individual bidders. Embodiments of the present invention also provide a method that allows for the negotiation organizer to negotiate the terms of the offer with individual bidders.

Figure 6:
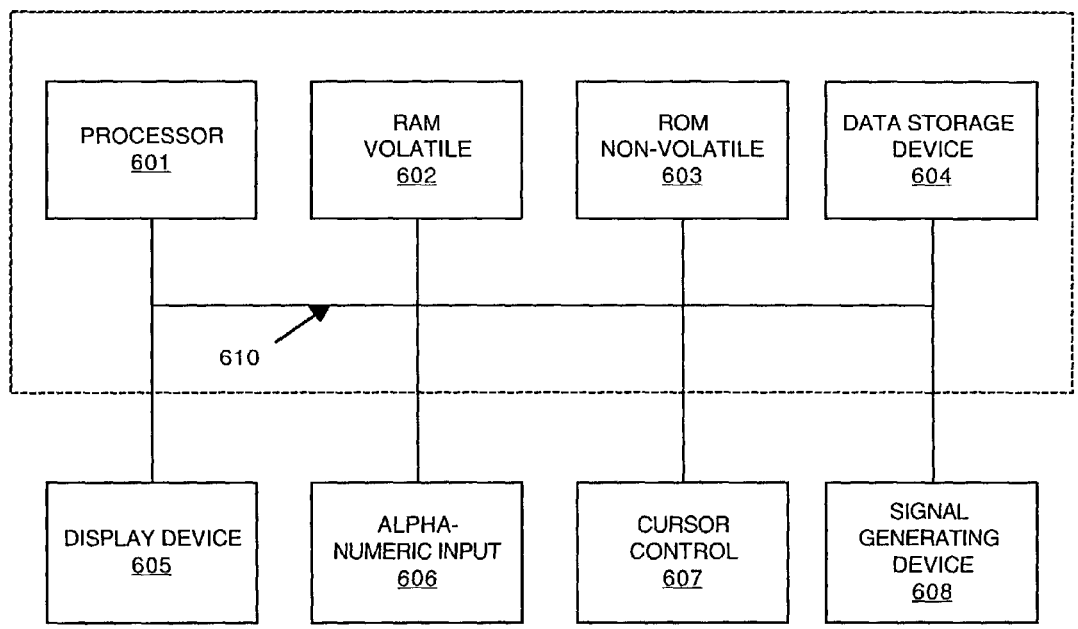
FIG. 6 illustrates a block diagram of an exemplary computer system upon which embodiments of the present invention may be implemented.

Exemplary Hardware Upon which Embodiments of the Present Invention May be Implemented Portions of the present invention are comprised of computer-readable and computer executable instructions which reside, for example, in computer-usable media of a computer system. FIG. 6 illustrates a block diagram of an exemplary computer system 600 upon which embodiments of the present invention may be implemented. Computer system 600 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 600) and are executed by the processor(s) of system 600. When executed, the instructions cause the computer system 600 to implement the functionality of the present invention as described above.

In general, computer system 600, shows the basic components of a computer system used to implement "server" machines and "client" machines. Computer system 600 comprises an address/data bus 610 for communicating information, one or more central processors 601 coupled with the bus 610 for processing information and instructions, a computer readable volatile memory unit 602 (e.g., random access memory, static RAM, dynamic, RAM, etc.) coupled with the bus 610 for storing information and instructions for the central processor(s) 601, a computer readable non-volatile memory unit 603 (e.g., read only memory, programmable ROM, flash memory, EPROM, EEPROM, etc.) coupled with the bus 610 for storing static information and instructions for the processor(s) 601. System 600 also includes a computer readable data storage device 604 such as a magnetic or optical disk and disk drive coupled with the bus 610 for storing information and instructions. Optionally, system 600 can include a display device 605 coupled to the bus 610 for displaying information to the computer user, an alphanumeric input device 606 including alphanumeric and function keys coupled to the bus 610 for communicating information and command selections to the central processor(s) 601, a cursor control device 607 coupled to the bus for communicating user input information and command selections to the central processor(s) 601, and a signal generating device 608 coupled to the bus 610 for communicating command selections to the processor(s) 601.

The preferred embodiment of the present invention, a method and system implementing an offer/counteroffer negotiation, is thus described. While the present invention has been described in particular embodiments, it should be appreciated that the present invention should not be construed as limited by such embodiments, but rather construed according to the below claims.

What is claimed is:

1. A method for implementing an auction including an offer/counteroffer negotiation, said method comprising:
   receiving at an exchange server host characteristics that define initial terms of an offer associated with a first item of a procurement process, said first item comprising a good, said characteristics comprising a total quantity of the first item and at least a first term wherein said first term identifies an aspect associated with said first item other than a price for said first item and the total quantity of the first item, wherein the terms of the offer are accessible by a first plurality of competitive bidders and a negotiation organizer and changeable by the negotiation organizer with respect to each of the first plurality of competitive bidders individually during the auction, and wherein the negotiation organizer comprises a buyer of the item and each of the first plurality of competitive bidders comprises a seller of the item;
   publishing said offer by the exchange server host to the first plurality of competitive bidders in the auction;
   conducting a first negotiation of said first term of said offer for a first quantity of the first item less than the total quantity of the first item with the exchange server host between the negotiation organizer and a first bidder of said first plurality of competitive bidders during the auction and while continuing to accept bids from the first plurality of competitive bidders other than the first bidder based on the initial terms of the offer, said first negotiation comprising:
      receiving a counteroffer for the first quantity of the first item from said first bidder at the exchange server host, said counteroffer comprising at least one first alternative that changes said first term with respect to the first bidder;
      provided said counteroffer is acceptable to the negotiation organizer, accepting said counteroffer and updating the total quantity of the first item with the exchange server host; and
      provided said counteroffer is not acceptable to the negotiation organizer, transmitting a second counteroffer for the first quantity of the first item from the exchange server host to said first bidder, said second counteroffer comprising at least one second alternative to said first term that changes said first alternative; and
   presenting from the exchange server host a negotiation status to all of the first plurality of bidders during the first negotiation, the negotiation status including a current status of the first negotiation and a first remaining quantity of the first item, the first remaining quantity based on the total quantity and the first quantity.

2. The method as recited in claim 1 wherein said characteristics further include a price of said first item.

3. The method as recited in claim 1 wherein said characteristics are selected from the group consisting of: a required delivery date of said first item, and a quantity of said first item.

4. The method as recited in claim 1 further comprising presenting an offer status to the first plurality of competitive bidders from the exchange server host.

5. The method as recited in claim 1 further comprising:
   conducting a second negotiation of said first term of said offer for a second quantity of the first item less than the first remaining quantity with the exchange server host between the negotiation organizer and a second bidder of said first plurality of competitive bidders and while continuing to accept bids from the first plurality of bidders other than the first bidder and the second bidder based on the initial terms of the offer and while conducting the first negotiation, said second negotiation comprising:
      receiving a third counteroffer from said second bidder at the exchange server host, said third counteroffer comprising at least one third alternative that changes said first term with respect to the second bidder;
      provided said third counteroffer is acceptable to the negotiation organizer, accepting said third counteroffer with the exchange server host; and
      provided said third counteroffer is not acceptable to the negotiation organizer, transmitting a fourth counteroffer to said second bidder from the exchange server host, said fourth counteroffer comprising at least one fourth alternative to said first term that changes said third alternative;
   wherein said first negotiation and said second negotiation occur independent of and competitive with each other and wherein presenting the negotiation status further includes presenting a current status of the second negotiation and a second remaining quantity of the first item based on the first remaining quantity and the second quantity.

6. The method of claim 5, wherein the third alternative is different from the first alternative.

7. The method of claim 6, further comprising:
   receiving at the exchange server host characteristics that define initial terms of an offer associated with a second item of the procurement process, said second item comprising a service, said characteristics comprising at least a first term wherein said first term identifies an aspect associated with said second item other than a price for said second item, wherein the terms of the offer are accessible by a second plurality of competitive bidders and the negotiation organizer and changeable by the negotiation organizer with respect to each of the second plurality of competitive bidders individually during the auction, and wherein each of the second plurality of competitive bidders comprises a provider of the service;

publishing said offer associated with the second item by the exchange server host to the second plurality of competitive bidders in the auction;

conducting a first negotiation of said first term of said offer associated with the second item with the exchange server host between the negotiation organizer and a first bidder of said second plurality of competitive bidders during the auction and while continuing to accept bids from the second plurality of competitive bidders other than the first bidder based on the initial terms of the offer associated with a second item, said first negotiation comprising:

receiving a counteroffer for the second item from said first bidder of said second plurality of bidders at the exchange server host, said counteroffer comprising at least one first alternative that changes said first term with respect to the first bidder;

provided said counteroffer is acceptable to the negotiation organizer, accepting said counteroffer with the exchange server host; and provided said counteroffer is not acceptable to the negotiation organizer, transmitting a second counteroffer for the second item from the exchange server host to said first bidder of said second plurality of bidders, said second counteroffer comprising at least one second alternative to said first term that changes said first alternative; and presenting from the exchange server host a negotiation status to all of the first plurality of bidders and the second plurality of bidders during the first negotiation, the negotiation status including a current status of the first negotiation.

8. A computer-readable memory having computer-readable program code stored therein for causing a computer system to perform a method for implementing an auction including an offer/counteroffer negotiation, said method comprising:

receiving characteristics that define initial terms of an offer associated with a first item of a procurement process, said first item comprising a good, said characteristics comprising a total quantity of the first item and at least a first term, wherein said first term identifies an aspect associated with said first item in addition to a price for said first item and the total quantity of the first item, wherein the terms of the offer are accessible by a first plurality of competitive bidders and a negotiation organizer and changeable by the negotiation organizer with respect to each of the first plurality of competitive bidders individually, and wherein the negotiation organizer comprises a buyer of the item and each of the first plurality of competitive bidders comprises a seller of the item;

publishing said offer to the first plurality of competitive bidders in the auction;

conducting a first negotiation of said first term of said offer for a first quantity of the first item less than the total quantity of the first item between the negotiation organizer and a first bidder of said first plurality of competitive bidders during the auction and while continuing to accept bids from the first plurality of bidders other than the first bidder based on the initial terms of the offer, said first negotiation comprising:

receiving a counteroffer for the first quantity of the first item from said first bidder, said counteroffer comprising at least one first alternative that changes said first term with respect to the first bidder;

provided said counteroffer is acceptable to the negotiation organizer, accepting said counteroffer and updating the total quantity of the first item; and provided said counteroffer is not acceptable to the negotiation organizer, transmitting a second counteroffer for the first quantity of the first item to said first bidder, said second counteroffer comprising at least one second alternative to said first term that changes said first alternative;

presenting a negotiation status to the first plurality of bidders during the first negotiation, the negotiation status including a current status of the first negotiation and a first remaining quantity of the first item, the first remaining quantity based on the total quantity and the first quantity;

conducting a second negotiation of said first term of said offer for a second quantity of the first item less than the total quantity of the first item between the negotiation organizer and a second bidder of said first plurality of competitive bidders and while continuing to accept bids from the first plurality of bidders other than the second bidder based on the initial terms of the offer and while conducting the first negotiation, wherein said first negotiation and said second negotiation occur independent of and competitive with each other, said second negotiation comprising:

receiving a third counteroffer for the second quantity of the first item from said second bidder, said third counteroffer comprising at least one third alternative that changes said first term with respect to the second bidder;

provided said third counteroffer is acceptable to the negotiation organizer, accepting said third counteroffer and updating the total quantity of the first item; and provided said third counteroffer is not acceptable to the negotiation organizer, transmitting a fourth counteroffer for the second quantity of the first item to said second bidder, said fourth counteroffer comprising at least one fourth alternative to said first term that changes said third alternative;

presenting a negotiation status to the first plurality of bidders during the second negotiation, the negotiation status including a current status of the second negotiation and a second remaining quantity of the first item, the second remaining quantity based on the first remaining quantity and the second quantity;

receiving characteristics that define initial terms of an offer associated with a second item of the procurement process, said second item comprising a service, said characteristics comprising at least a first term wherein said first term identifies an aspect associated with said second item other than a price for said second item, wherein the terms of the offer are accessible by a second plurality of competitive bidders and the negotiation organizer and changeable by the negotiation organizer with respect to each of the second plurality of competitive bidders individually during the auction, and wherein each of the second plurality of competitive bidders comprises a provider of the service;

publishing said offer associated with the second item to the second plurality of competitive bidders in the auction; and conducting a third negotiation of said first term of said offer associated with the second item between the negotiation organizer and a first bidder of said second plurality of competitive bidders during the auction and while continuing to accept bids from the second plurality of competitive bidders other than the first bidder based on the initial terms of the offer associated with a second item, said third negotiation comprising:
   receiving a counteroffer for the second item from said first bidder of said second plurality of bidders, said counteroffer comprising at least one first alternative that changes said first term with respect to the first bidder;
   provided said counteroffer is acceptable to the negotiation organizer, accepting said counteroffer;
   provided said counteroffer is not acceptable to the negotiation organizer, transmitting a second counteroffer for the second item to said first bidder of said second plurality of bidders, said second counteroffer comprising at least one second alternative to said first term that changes said first alternative; and
   presenting a negotiation status to the first plurality of bidders and the second plurality of bidders during the third negotiation, the negotiation status including a current status of the third negotiation.

9. The computer-readable memory as recited in claim 8 wherein said characteristics that define the initial terms of the offer associated with the first item are selected from the group consisting of: a required delivery date of said first item, and a quantity of said first item.

10. A computer system comprising:
   a memory unit, and
   a processor coupled to said memory unit bus, said processor for executing a method for implementing an auction including an offer/counteroffer negotiation, said method comprising:
      receiving characteristics that define initial terms of an offer associated with a first item of a procurement process, said first item comprising a good, said characteristics comprising a total quantity of the first item and at least a first term, wherein said first term identifies an aspect associated with said first item in addition to a price for said first item and the total quantity of the first item, wherein the terms of the offer are accessible by a first plurality of competitive bidders and a negotiation organizer and changeable by the negotiation organizer with respect to each of the first plurality of competitive bidders individually, and wherein the negotiation organizer comprises a buyer of the item and each of the first plurality of competitive bidders comprises a seller of the item;
      publishing said offer to the first plurality of competitive bidders in the auction;
      conducting a first negotiation of said first term of said offer for a first quantity of the first item less than the total quantity of the first item between the negotiation organizer and a first bidder of said first plurality of competitive bidders during the auction and while continuing to accept bids from the first plurality of bidders other than the first bidder based on the initial terms of the offer, said first negotiation comprising:
         receiving a counteroffer for the first quantity of the first item from said first bidder, said counteroffer comprising at least one first alternative that changes said first term with respect to the first bidder;
         provided said counteroffer is acceptable to the negotiation organizer, accepting said counteroffer and updating the total quantity of the first item; and
         provided said counteroffer is not acceptable to the negotiation organizer, transmitting a second counteroffer for the first quantity of the first item to said first bidder, said second counteroffer comprising at least one second alternative to said first term that changes said first alternative;
      conducting a second negotiation of said first term of said offer for a second quantity of the first item less than the total quantity of the first item between the negotiation organizer and a second bidder of said first plurality of competitive bidders and while continuing to accept bids from the first plurality of bidders other than the second bidder based on the initial terms of the offer and while conducting the first negotiation, wherein said first negotiation and said second negotiation occur independent of and competitive with each other, said second negotiation comprising:
         receiving a third counteroffer for the second quantity of the first item from said second bidder, said third counteroffer comprising at least one third alternative that changes said first term with respect to the second bidder;
         provided said third counteroffer is acceptable to the negotiation organizer, accepting said third counteroffer and updating the total quantity of the first item; and
         provided said third counteroffer is not acceptable to the negotiation organizer, transmitting a fourth counteroffer for the second quantity of the first item to said second bidder, said fourth counteroffer comprising at least one fourth alternative to said first term that changes said third alternative, wherein said first negotiation and said second negotiation occur independent of and competitive with each other and wherein updating the total quantity of the item comprises determining a remaining quantity of the item based on the first quantity or the second quantity and acceptance of the first counter offer, second counteroffer, third counteroffer, or fourth counteroffer and wherein conducting the first negotiation and conducting the second negotiation comprise providing the remaining quantity to the plurality of competitive bidders while conducting the first negotiation or the second negotiation;
   receiving characteristics that define initial terms of an offer associated with a second item of the procurement process, said second item comprising a service, said characteristics comprising at least a first term wherein said first term identifies an aspect associated with said second item other than a price for said second item, wherein the terms of the offer are accessible by a second plurality of competitive bidders and the negotiation organizer and changeable by the negotiation organizer with respect to each of the second plurality of competitive bidders individually during the auction, and wherein each of the second plurality of competitive bidders comprises a provider of the service;
   publishing said offer associated with the second item to the second plurality of competitive bidders in the auction; and
   conducting a third negotiation of said first term of said offer associated with the second item between the negotiation organizer and a first bidder of said second plurality of competitive bidders during the auction and while continuing to accept bids from the second plurality of competitive bidders other than the first bidder based on the initial terms of the offer associated with a second item, said third negotiation comprising:
      receiving a counteroffer for the second item from said first bidder of said second plurality of bidders, said counteroffer comprising at least one first alternative that changes said first term with respect to the first bidder;

provided said counteroffer is acceptable to the negotiation organizer, accepting said counteroffer; and provided said counteroffer is not acceptable to the negotiation organizer, transmitting a second counteroffer for the second item to said first bidder of said second plurality of bidders, said second counteroffer comprising at least one second alternative to said first term that changes said first alternative.

11. The computer system as recited in claim 10 wherein said method further comprises presenting a negotiation status to all of the first plurality of bidders and the second plurality of bidders during the first negotiation, second negotiation, and third negotiation, the negotiation status including a current status of the first negotiation, second negotiation, and third negotiation.

12. The computer system as recited in claim 11 wherein said offer status comprises a remaining quantity of said first item based on the total quantity and the first quantity.

13. The computer system as recited in claim 12 wherein said method further comprises, provided at least one counteroffer is accepted, updating said remaining quantity.

* * * * *

UNITED STATES PATENT AND TRADEMARK OFFICE
CERTIFICATE OF CORRECTION

| | | |
|---|---|---|
| PATENT NO. | : 8,108,284 B2 | Page 1 of 1 |
| APPLICATION NO. | : 10/185121 | |
| DATED | : January 31, 2012 | |
| INVENTOR(S) | : Benjamin et al. | |

It is certified that error appears in the above-identified patent and that said Letters Patent is hereby corrected as shown below:

On Title page, in column 2, item (57) under "Abstract", line 2, after "offer" insert -- of or --.

In column 2, line 52, after "offer" insert -- of or --.

In column 8, line 30, after "for" delete "10,".

In column 8, line 60, delete "600," and insert -- 600 --, therefor.

Signed and Sealed this
First Day of May, 2012

David J. Kappos
*Director of the United States Patent and Trademark Office*